(12) United States Patent
Petkovsek et al.

(10) Patent No.: US 9,251,726 B2
(45) Date of Patent: Feb. 2, 2016

(54) UNITARY FORM FOR MAILING A MAILPIECE VIA A SPECIAL SERVICE AND METHOD OF USING SAME

(71) Applicant: USA Images of Florida, L.L.C., Vero Beach, FL (US)

(72) Inventors: Glenn Petkovsek, Vero Beach, FL (US); Robert Bluejacket, Cabot, AR (US)

(73) Assignee: USA Images of Florida, LLC, Vero Beach, FL (US)

( * ) Notice: Subject to any disclaimer, the term of this patent is extended or adjusted under 35 U.S.C. 154(b) by 161 days.

(21) Appl. No.: 14/032,479

(22) Filed: Sep. 20, 2013

(65) Prior Publication Data

US 2015/0084326 A1    Mar. 26, 2015

(51) Int. Cl.
| | | |
|---|---|---|
| *G09F 3/10* | (2006.01) | |
| *G06Q 10/08* | (2012.01) | |
| *G07B 17/00* | (2006.01) | |
| *B42D 15/00* | (2006.01) | |
| *G09F 3/02* | (2006.01) | |
| *G09F 3/00* | (2006.01) | |

(52) U.S. Cl.
CPC ............... *G09F 3/10* (2013.01); *B42D 15/006* (2013.01); *G06Q 10/0833* (2013.01); *G06Q 10/0837* (2013.01); *G07B 17/00508* (2013.01); *G09F 3/02* (2013.01); *G09F 3/0288* (2013.01); *G07B 2017/0062* (2013.01); *G07B 2017/00596* (2013.01); *G09F 2003/0272* (2013.01)

(58) Field of Classification Search
CPC .......................... B42D 15/006; G09F 3/0288
USPC ................... 283/81; 428/42.2, 42.3
See application file for complete search history.

(56) References Cited

U.S. PATENT DOCUMENTS

| | | |
|---|---|---|
| 5,573,277 A | 11/1996 | Petkovsek |
| 5,848,809 A | 12/1998 | Petkovsek |
| 5,887,904 A | 3/1999 | Petkovsek |
| 6,010,156 A * | 1/2000 | Block .......................... 283/81 |
| 6,041,999 A | 3/2000 | Petkovsek |
| 6,047,880 A | 4/2000 | Petkovsek |
| 6,089,613 A | 7/2000 | Petkovsek |
| 6,120,063 A | 9/2000 | Petkovsek |
| 6,203,068 B1 | 3/2001 | Petkovsek |
| 6,241,844 B1 | 6/2001 | Petkovsek |
| 6,361,077 B1 | 3/2002 | Petkovsek |

(Continued)

OTHER PUBLICATIONS

Wikipedia (QR Code) https://en.wikipedia.org/wiki/QR_code (2010 reference of use).*

*Primary Examiner* — Kyle Grabowski
(74) *Attorney, Agent, or Firm* — Patents+TMS, P.C.

(57) ABSTRACT

A form for mailing a mailpiece using a special service has a sheet and a label removably attached to the sheet. The label has information related to the delivery of the article by the special service on the front side. The back side of the label attaches to the article. An electronic return receipt information section and a special services designation section including information indicative of the special service are located on the label. The mailpiece is prepared for delivery by the special service by printing information on the form necessary to comply with the special service delivery requirements. The information has data concerning electronic return receipt of the mailpiece and a machine-readable code section with machine-readable information associated with the mailpiece. The form is removed from the sheet and attached to the mailpiece.

11 Claims, 10 Drawing Sheets

(56) References Cited

U.S. PATENT DOCUMENTS

| | | |
|---|---|---|
| 6,371,521 B1 | 4/2002 | Petkovsek |
| 6,676,794 B1 | 1/2004 | Petkovsek |
| 6,962,371 B1 | 11/2005 | Petkovsek |
| 7,350,820 B1 | 4/2008 | Petkovsek |
| 2012/0145773 A1 | 6/2012 | Petkovsek |

* cited by examiner

UNITARY FORM FOR MAILING A MAILPIECE VIA A SPECIAL SERVICE AND METHOD OF USING SAME

BACKGROUND OF THE INVENTION

The present invention generally relates to a form for mailing a mailpiece requiring delivery by a special service. More specifically, the present invention relates to a unitary special service mailing form for mailing a mailpiece requiring delivery by a special service having an electronic return receipt with a label indicative of the special service and a method for using same.

It is generally known to mail items requiring special services for delivery of the item, such as certified mail, registered mail, priority mail, first class mail, critical mail, insured mail, cash on delivery ("COD"), return receipt for merchandise and/or the like. For example, the U.S. Postal Service ("USPS") provides certified mail service and registered mail service for priority mail and for first class mail. For certified mail, the USPS may provide both proof of deposit, proof of delivery, and online tracking using a tracking number or a unique article ID. For certified mail, the USPS may obtain a signature of the recipient at the time of delivery which the USPS electronically stores in USPS records and which may be retrieved by the sender. Registered mail may be used for highly valuable and/or irreplaceable items. Registered mail may include tracking services. Critical mail service may provide proof of deposit, proof of delivery, recipient signature confirmation and online tracking using the tracking number and/or the unique article ID.

Known components and methods for assembling a mailer for mailing items requiring special services may have multiple, separate components requiring attachment to an exterior of an envelope for the special services delivery of the item.

A postal employee typically may receive an envelope from a customer for mailing the item via the special service. The postal employee then may require the customer to attach or otherwise provide the envelope with a permanent seal or label indicating that the envelope requires delivery and/or tracking by the special service. The postal employee must ensure that all appropriate labels and documents are both stocked and available for use and are completed and affixed to the envelope prior to delivery of the article. Such a procedure may be complex, time-consuming and labor-intensive. Further, the procedure may be confusing to the customer mailing the item.

Further, the postal employee must ensure that all labels and/or postcards and the return receipt postcard must be suitably affixed to the envelope so that the return postcard is not removed during the mailing of the article to its destination. Of course, it should be understood that an envelope prepared for special service mailing may be prepared by any individual, not just a postal employee.

A need exists for a simplified, unitary form for use with delivery of a mailpiece requiring a special service. To eliminate some of the problems with typical mailing systems, a mail customer may utilize an electronic return receipt service available from the USPS. Users of such a service may obtain their return receipts in bulk rather than by individual requests. This service meets at least three customer needs. First, the electronic return receipt service may save time and free the mail owner from having to request individual proof of delivery records and/or from placing PS Form 3811, Domestic Return Receipt, on each mailpiece. Second, users of the electronic return receipt service may retain signature records for longer than the standard retention period of the USPS. Third, the electronic return receipt service may provide users with a more efficient way to handle signature records. Also, users may receive mailpiece recipient signatures in bulk by participating in the Bulk Proof of Delivery ("BPOD") program offered by the USPS. BPOD allows participants using privately printed certified mail, insured mail (more than $200), or registered mail bar-coded labels to add return receipt service and receive those return receipts electronically in bulk. With this scenario, when a USPS employee delivers a signature-service mailpiece, the recipient signs his or her name on PS Form 3849, Delivery Notice/Reminder/Receipt. The USPS employee may scan customer information on the form, and the customer information may then be linked to the delivery event for the mailpiece. Typically, the process may be completed within twenty-four hours.

A need, therefore, exists for a unitary special service mailing form for mailing an item requiring delivery by a special service such as certified mail, insured mail, registered mail, COD, return receipt for merchandise and the like having an electronic return receipt and a label indicative of the special service and a method for using same.

SUMMARY OF THE INVENTION

The present invention generally relates to a form for mailing a mailpiece requiring delivery by a special service. More specifically, the present invention relates to a unitary special service mailing form for mailing a mailpiece requiring delivery by a special service having an electronic return receipt with a label indicative of the special service and a method for using same.

To this end, in an embodiment, a form for special service delivery of a mailpiece is provided. The form may have a sheet and a label attached to the sheet. The label may have a front side and a back side. The back side may be located opposite to the front side. The label may have information related to the delivery of the mailpiece by the special service on the front side. The label may be removed from the sheet, and the back side of the label may attach to the mailpiece. A first section on the front side of the label may have information related to an electronic return receipt service associated with the mailpiece. The first section may have a machine-readable code section having machine-readable information associated with the mailpiece. A second section on the front side of the label may have information indicative of the special service for delivery of the mailpiece.

In an embodiment, the form may have a tab on the label. The tab may have information indicative of the special service. The tab may be removed from the sheet and may attach to the mailpiece.

In an embodiment, the form may have an adhesive on the back side of the label.

In an embodiment, the form may have an auxiliary label on the form.

In an embodiment, the sheet may be a silicone sheet.

In an embodiment, the form may have an auxiliary special services designator section removably attached to the sheet. The auxiliary special services designator section may have information indicative of the special service.

In an embodiment, the form may have a receipt removably attached to the sheet. The receipt may have information associated with the delivery of the mailpiece by the special service.

In an embodiment, the form may have an address label removably attached to the sheet. The address label may have information associated with a delivery address of the mailpiece.

In an embodiment, the form may have an auxiliary information section printed on the sheet. The auxiliary information section may have information unrelated to the mailpiece.

In an embodiment, the form may have a Quick Response (QR) code printed on the sheet. The QR code may have machine-readable information.

In an embodiment, the form may have instructions for use of the form printed on the sheet.

In an embodiment, the label may have information that corresponds to U.S. Postal Service Form 3800.

In another embodiment, a method for preparing a mailpiece for delivery by a special service using a form attached to a sheet is provided. The method may have the step of printing information necessary to comply with requirements for the delivery of the mailpiece by the special service on the form. The information may have data concerning electronic return receipt of the mailpiece. The method may have the step of printing information related to delivery of the mailpiece on the form. The method may also have the step of printing information necessary to comply with requirements for electronic return receipt of the mailpiece on the form. The information may have a machine-readable code section having machine-readable information associated with the mailpiece. The method may have the step of removing the form from the sheet and attaching the form to the mailpiece.

In an embodiment, the method may have the step of printing a receipt on the form. The receipt may have information related to the delivery of the mailpiece. The method may also have the step of removing the receipt from the form before mailing the mailpiece.

In a further embodiment, a method for preparing a mailpiece for delivery by a special service using a mailing application on a computer system is provided. The method may have the steps of accessing the mailing application on the computer system and creating a mail file using the mailing application. The mail file may have information associated with delivery and the special service for the mailpiece. The method may also have the steps of processing the mail file information using the mailing application to produce an image containing information required by an entity to deliver the mailpiece by the special service and printing the image onto a form and affixing the form to the mailpiece.

In an embodiment, the method may have the step of connecting to a service provider for performing address standardization of the information in the mail file.

In an embodiment, the method may have the step of printing a mail file report as a receipt of mailing of the mailpiece.

In an embodiment, the method may have the steps of transferring the mail file to the entity using the mailing application and receiving tracking information from the entity.

In an embodiment, the method may have the step of receiving electronic return receipt information from the entity.

In an embodiment, the method may have the step of storing electronic return receipt information from the entity in a database using the mailing application.

It is, therefore, an advantage of the present invention to provide a form for mailing an article requiring delivery by a special service, such as, for example, priority mail, certified mail, critical mail and/or the like.

Another advantage of the present invention is to provide a simplified method for mailing an article requiring special services.

A further advantage of the present invention is to provide an assembly that is integrally formed as a complete unit for mailing and labeling of an article requiring special services.

Yet another advantage of the present invention is to provide a form and a method for mailing an article requiring special services without requiring additional adhesives or fixatives for attaching the same to the mailpiece.

Moreover, an advantage of the present invention is to provide a form and a method for mailing an article requiring special services that is substantially foolproof.

Yet, a further advantage of the present invention is to provide a form which works on automated printing equipment.

Another advantage of the present invention is to provide a form that provides for pre-imaging or pre-printing of variable information thereon.

An advantage of the present invention is to provide a form and a method for mailing an article requiring special services that uses an electronic return receipt.

Yet another advantage of the present invention is to provide a form and a method for mailing an article requiring special services without requiring that any additional forms be attached to the mailpiece.

A further advantage of the present invention is to provide a form and/or a method for mailing correspondence and/or articles via a special service that may allow a customer to print correspondence, addresses, fees and/or the like directly on the form prior to assembly and deposit with a postal carrier and/or the delivery person.

Another advantage of the present invention is to provide a form and/or a method for mailing correspondence and/or articles via a special service that may be intuitive and easy to use by a customer requiring a special services mailing assembly or special equipment.

Another advantage of the present invention is to provide a form and/or a method for mailing correspondence and/or articles via a special service that may have a detachable portion.

Yet another advantage of the present invention is to provide a form and/or a method for mailing correspondence and/or articles via a special service wherein the detachable portion may have removable adhesive labels, such as, for example, an addressee label, a return address label, a special service label, a unique article number label, a bar code label, a tracking number label, a postage label, a receipt and/or the like to effect and/or to track delivery via the special service.

A still further advantage of the present invention is to provide a form and/or a method for mailing correspondence and/or articles via a special service that may be customized prior to mailing using simplex and/or duplex printing methods.

Moreover, an advantage of the present invention is to provide a form and/or a method for mailing correspondence and/or articles via a special service wherein one or more of the removable adhesive labels may be removed from the detachable portion and affixed to the article and/or package to effect delivery.

Another advantage of the present invention is to provide a form and/or a method for mailing correspondence and/or articles via a special service wherein information, such as, for example, a delivery address, a return address, a special services tracking number, a special service bar code, postage and/or the like may be printed on the form before and/or after final assembly for deposit with the postal carrier and/or delivery person.

A further advantage of the present invention is to provide a form and/or a method for mailing correspondence and/or articles via a special service wherein a removable label section is provided on the form.

Yet another advantage of the present invention is to provide a form and/or a method for mailing correspondence and/or articles via a special service wherein the special services designation section is variably printed with a machine readable code.

A further advantage of the present invention is to provide a form and/or a method for mailing correspondence and/or articles via a special service wherein an area within the special services designation section has a machine readable code.

Another advantage of the present invention is to provide a form and/or a method for mailing correspondence and/or articles via a special service wherein the special services designation section is distinctly colored.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention relates to an integral special service mailing form for mailing an article requiring delivery by a special service. Further, the present invention relates to a method for using the form for mailing articles requiring delivery by a special service.

Figure 1:
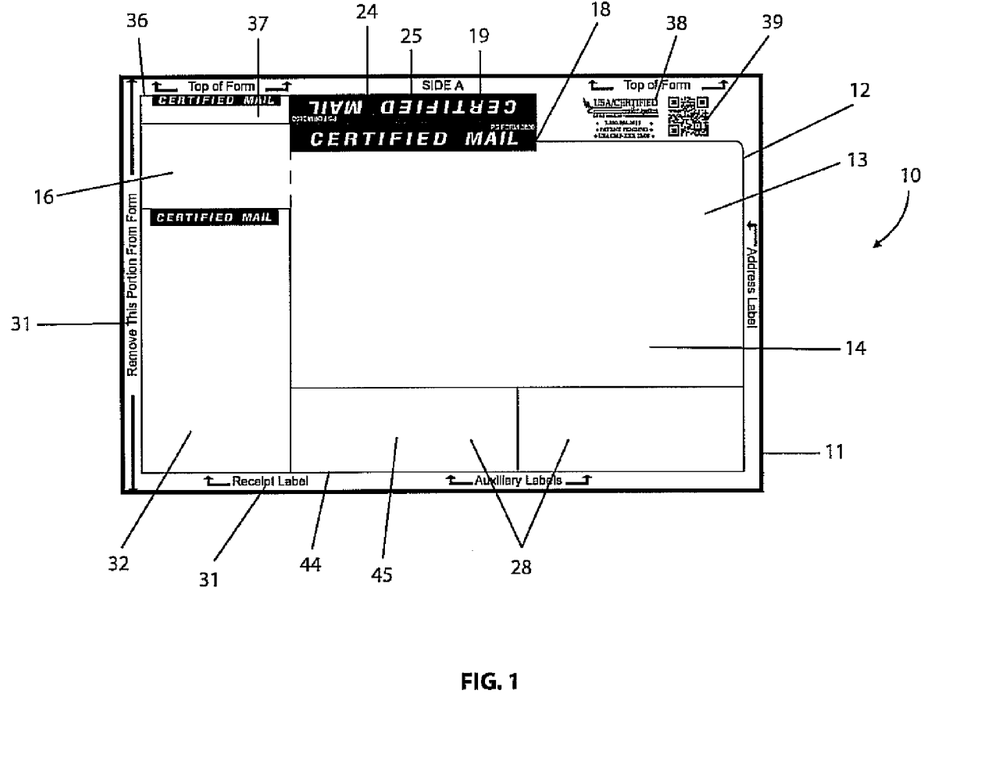
FIG. 1 illustrates a plan view of a front side of an embodiment of the present invention.
Figure 5:
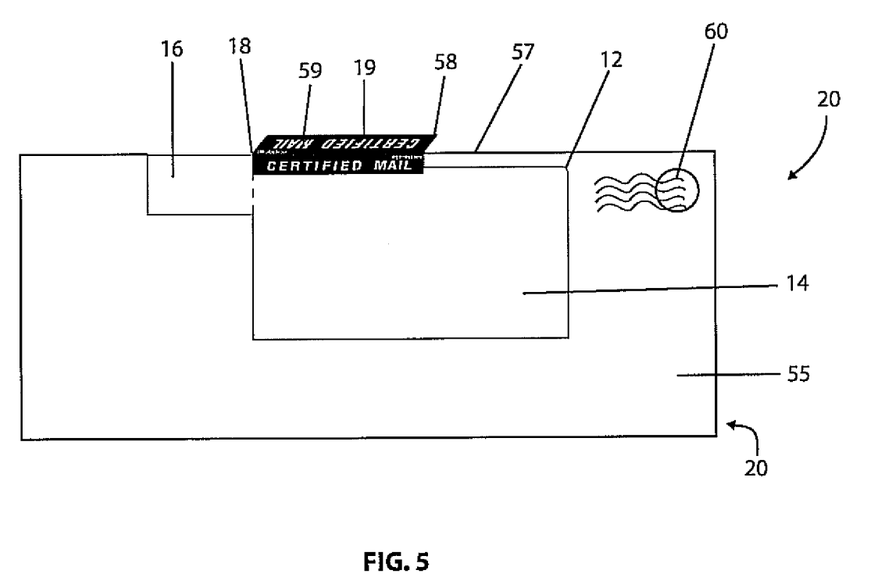
FIG. 5 illustrates a plan view of a front side of an embodiment of the present invention with an article to be mailed using the same.
Figure 6:
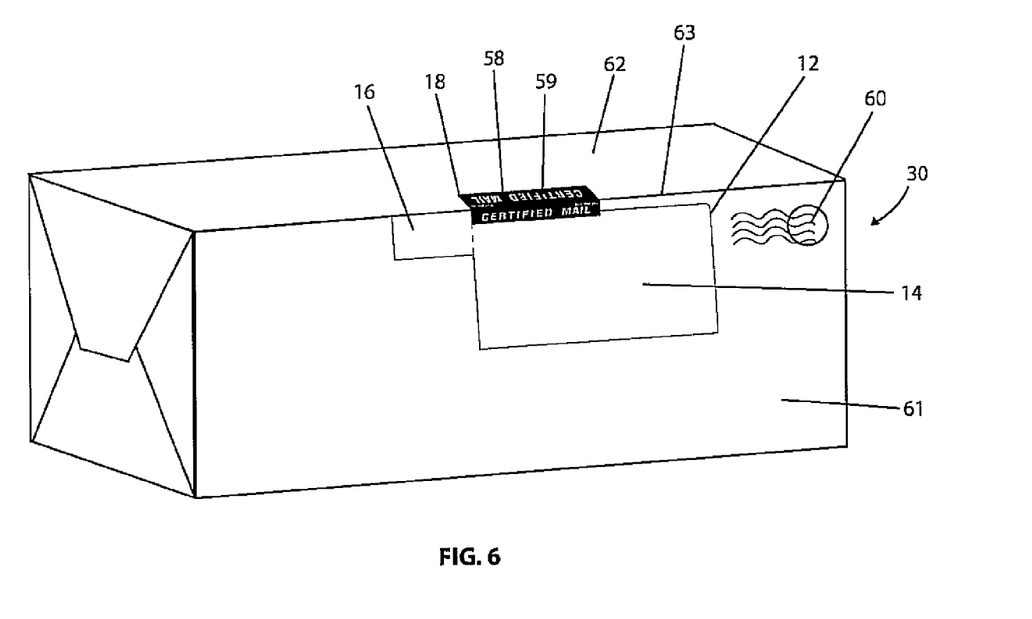
FIG. 6 illustrates a perspective view of an embodiment of the present invention with a package to be mailed using the same.

Referring now to the drawings, wherein like numerals refer to like parts, FIG. 1 is a front plan view that generally illustrates an embodiment of a form 10. The form 10 may be used for mailing an item requiring a special service as shown in FIGS. 5 and 6. Although a certified mail envelope 20 is illustrated in FIG. 5 and a certified mail package 30 is illustrated in FIG. 6, it should be understood that the present invention may be applicable to any item requiring any one or more special services, such as insured mail, registered mail, COD, return receipt for merchandise and the like. As used herein, the envelope 20 and/or the package 30 may be referred to, in general, as a mailpiece.

Figure 2:
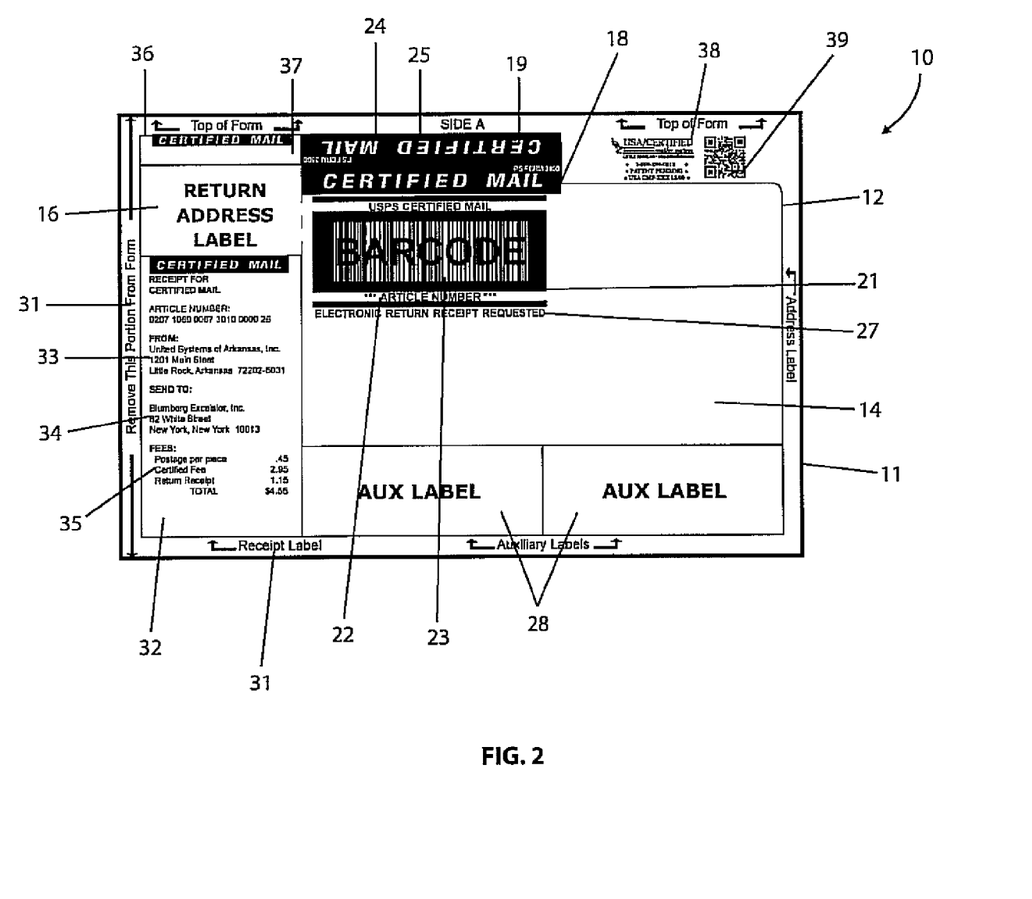
FIG. 2 illustrates a plan view of a front side of an embodiment of the present invention.

As shown in FIGS. 1 and 2, the form 10 may have components and/or sections. FIG. 1 illustrates the form 10 in a "blank" state, i.e., without any printing related to the delivery of the mailpiece in which the form 10 may be used. As shown, the form 10 may be provided in a blank state and/or a printed state. For example, the form 10 may be printed for use as certified mail. In particular, FIG. 1 illustrates the form 10 in a blank state, and FIG. 2 illustrates the form 10 in a partially printed state. In FIG. 2, certain sections of the form 10 may have printing related to the delivery of the mailpiece in which the form 10 may be used.

As shown in FIGS. 1 and 2, the form 10 may have a sheet 11. The sheet 11 may be manufactured from a type of material that may be removably attachable via an adhesive, for example, a sheet of UV silicone. Of course, other materials known to one having ordinary skill in the art may also be used for the sheet 11.

Further, the form 10 may have a label 12 having a front side 13. The label 12 may be, in a preferred embodiment, a pre-printed label indicative of the special service required for mailing of the mailpiece. For example, the mailpiece may be either the envelope 20 shown in FIG. 5 or the package 30 shown in FIG. 6. The front side 13 of the label 12 may be pre-printed. As illustrated in FIGS. 1 and 2, the label 12 may have several sections and/or components. For example, the label 12 may have an address label section 14. The address label section 14 may be pre-printed with the address of the intended recipient of the envelope 20 shown in FIG. 5 or the package 30 shown in FIG. 6. The form 10 may also have a return address label 16. The return address label 16 may be pre-printed with the address of the sender of the mailpiece.

Further, the label 12 may have a special services designation section 18 that may have information indicative of the special service on the label 12. Depending on the special service desired, the special services designation section 18 may have information necessary to comply with requirements for, for example, USPS Forms 3800, 3804, 3806, 3813, 3856 or the like. The special services designation section 18 may have a special service indicator 19 and a window section 21 in which an article identification number 22 may be printed. As shown in FIGS. 1 and 2, the special service indicator 19 may denote "CERTIFIED MAIL" as the type of special service used. However, any special services may be indicated, such as insured mail, registered mail, COD, return receipt for merchandise and/or the like.

The special services designation section 18 may also have a first area 24 that may be distinctly colored from a remainder of the area. For example, the color of the first area 24 may be green to designate the generally recognized color for certified mail or may be brown to designate the generally recognized color for return receipt for merchandise, or the like. Within the first area 24, a wording area 25 may be provided to specifically denote the type of special service for which the mailing may be implemented. As shown in FIGS. 1 and 2, the wording area 25 may contain the wording "CERTIFIED MAIL." The article identification number 22 may be provided within the special services designation section 18. The article identification number 22 may be a machine-readable number associated with the mailpiece. The machine-readable number of the article identification number 22 may be used for tracking of the mailpiece before, during and after delivery by the special service.

Further, a bar code 23 may be provided in the special services designation section 18. The bar code 23 may also be used for tracking of the mailpiece before, during and after delivery by the special service. The special services designation section 18 may have, for example, the special service indicator 19, the unique article identification number 22 and/or the bar code 23 pre-printed on the front side 13 of the label 12. The special services designation section 18 may be associated with the special service selected by the sender. Although references may be made to the USPS, the form 10 of the present invention may be used with any other postal/parcel carriers that the user may select.

Figure 9:
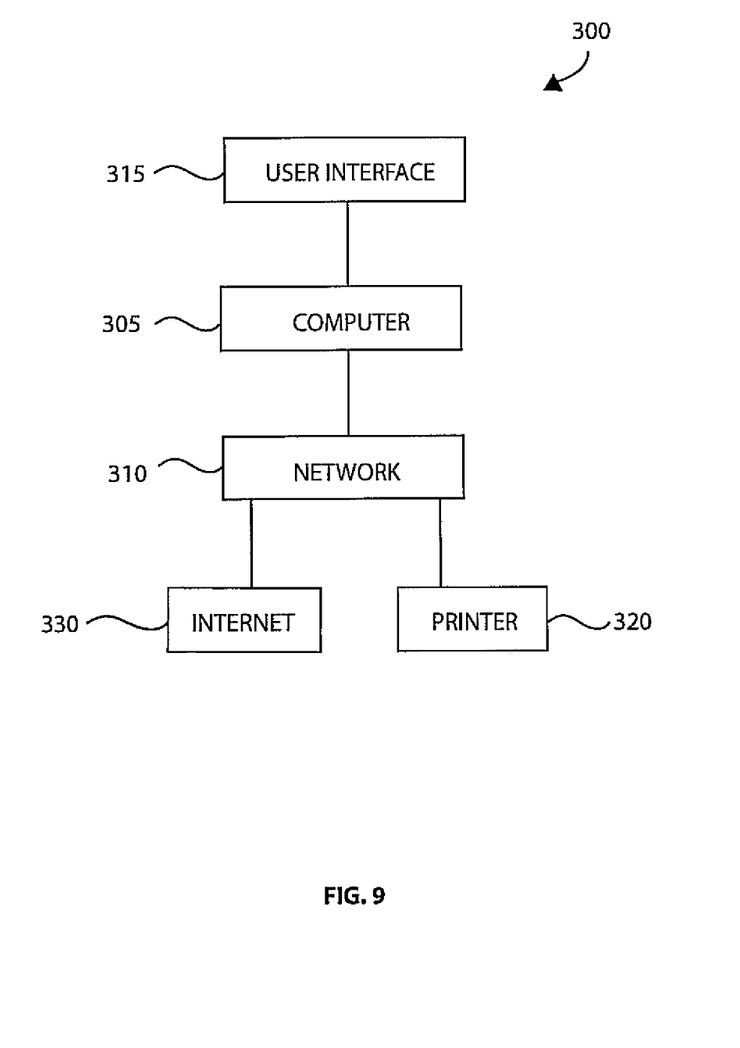
FIG. 9 illustrates a block diagram of an embodiment of a computer system for use with the present invention.

The postal/parcel carrier may scan or input the article identification number 22 and/or the barcode 23 into a computer system 300 (as shown in FIG. 9) for tracking the mailpiece on which the form 10 may be used. If the sender has not applied postage to the mailpiece, the postal/parcel carrier may sell postage to the sender and/or may apply postage to the mailpiece. The postal/parcel carrier may input the special service selected into the computer system 300 and/or may provide the sender with a receipt of deposit. The receipt may be used by the sender to track the delivery of the mailpiece via the special service.

In an embodiment, the article identification number 22, the tracking number and/or the bar code 23 may be printed on one of the removable labels and/or may be retained as a receipt by the sender. The postal/parcel carrier may input and/or scan the article identification number 22 and/or the bar code 23 into the computer system 300 upon delivery to the recipient of the mailpiece. The sender may refer to the article identification number 22 and/or the bar code 23 to track the mailpiece during and/or after delivery by the special service using, for example, a computer interface, a telephone interface and/or a website provided for the special service by the postal/parcel carrier.

Typically, the special services designation section 18 has been implemented as a separate and/or distinct form from a return postcard, for example, USPS Form 3811. The present invention may allow for incorporation of what previously required completion of two forms and subsequent attachment of the two forms to, for example, a package to be delivered requiring special services for delivery. As a result, use of the single form 10 of the present invention simplifies and/or expedites the preparation of the mailpiece requiring delivery by the special service, such as certified mail, return receipt for merchandise, insured mail, registered mail, and/or the like.

To further simplify the preparation of the mailpiece requiring delivery by a special service, the label 12 may also have an electronic return receipt ("ERR") information section 27 on the front side of the label 12 for use with the ERR service provided by the USPS. The electronic return receipt information section 27 may have the wording "ELECTRONIC RETURN RECEIPT REQUESTED." Use of the ERR service may satisfy at least three customer needs. First, the electronic return receipt service may save time and/or free the mail owner from having to request individual proof of delivery records and/or from placing PS Form 3811, Domestic Return Receipt, on each mailpiece. Second, users of the ERR service may retain signature records for longer than the standard retention period of the USPS. Third, the ERR service may provide users with a more efficient way to handle signature records.

Also, users may receive mailpiece recipient signatures in bulk by participating in the Bulk Proof of Delivery ("BPOD") program offered by the USPS. BPOD allows participants using privately printed certified mail, insured mail (more than $200), or registered mail bar-coded labels to add return receipt service and/or receive those return receipts electronically in bulk. With this scenario, when a USPS employee delivers a signature-service mailpiece, the recipient signs his or her name on PS Form 3849, Delivery Notice/Reminder/Receipt. The USPS employee may scan customer information on the form, and the customer information may then be linked to the delivery event for the mailpiece. Typically, the process may be completed within twenty-four hours. Thus, the electronic return receipt information section 27 may simplify the preparation and mailing process for the user, the USPS and/or the recipient of the mailpiece.

As further illustrated in FIGS. 1 and 2, the form 10 may have additional sections and/or components. For example, an auxiliary label 28 may be provided, and in an embodiment, more than one auxiliary label 28 may be provided. In the embodiment illustrated in FIGS. 1 and 2, two auxiliary labels 28 are shown. It should be understood that the auxiliary labels 28 may be printed with any information that the user may require. In addition, the form 10 may have text information 31 describing the components and/or sections of the form 10. The text information 31 may aid the user in understanding the use of the components and/or the sections in preparation of the form 10.

Further, the form 10 may have a receipt label 32. The receipt label 32 may have information relevant to the shipment. For example, such information may include, but is not limited to, the special service indicator 19 of the type of special service. For example, the special service indicator 19 in FIGS. 1 and 2 may denote "CERTIFIED MAIL" as the type of special service. The unique article identification number 22 may also be included on the receipt label 32. Further, a sender address 33 and/or a recipient address 34 may be included on the receipt label 32. Also, a fee summary 35 itemizing the fees associated with the special service and postage may be provided on the receipt label 32.

In addition, in the embodiment shown, an additional tracking label 36 may be provided. The additional tracking label 36, which also may have a section 37 for the article identification number 22, may be used for records that the sender may maintain. Further, the additional tracking label 36 may be provided with adhesive on its reverse side. The additional tracking label 36 may preferably be a peel and stick type label. The label 12 may be removably attached to the sheet 11. To this end, the label 12 may be adhesively backed for subsequent attachment to the mailpiece requiring delivery by a special service.

Moreover, the label 12 may have an auxiliary information section 38. The auxiliary information section 38 may have any information that may be related to the mailpiece and/or the special services delivery of the mailpiece. Also, the auxiliary information section 38 may have information unrelated to the particular mailpiece but related to the shipment and/or preparation of the mailpiece. For example, a Quick Response code ("QR code") 39 may be provided. The QR code 39 may connect the user with the contact information and/or the website of the manufacturer of the form 10 to facilitate the shipment and/or preparation of the mailpiece. Any other information may be accessible by using the QR code 39, such as advertising and the like.

Figure 3:
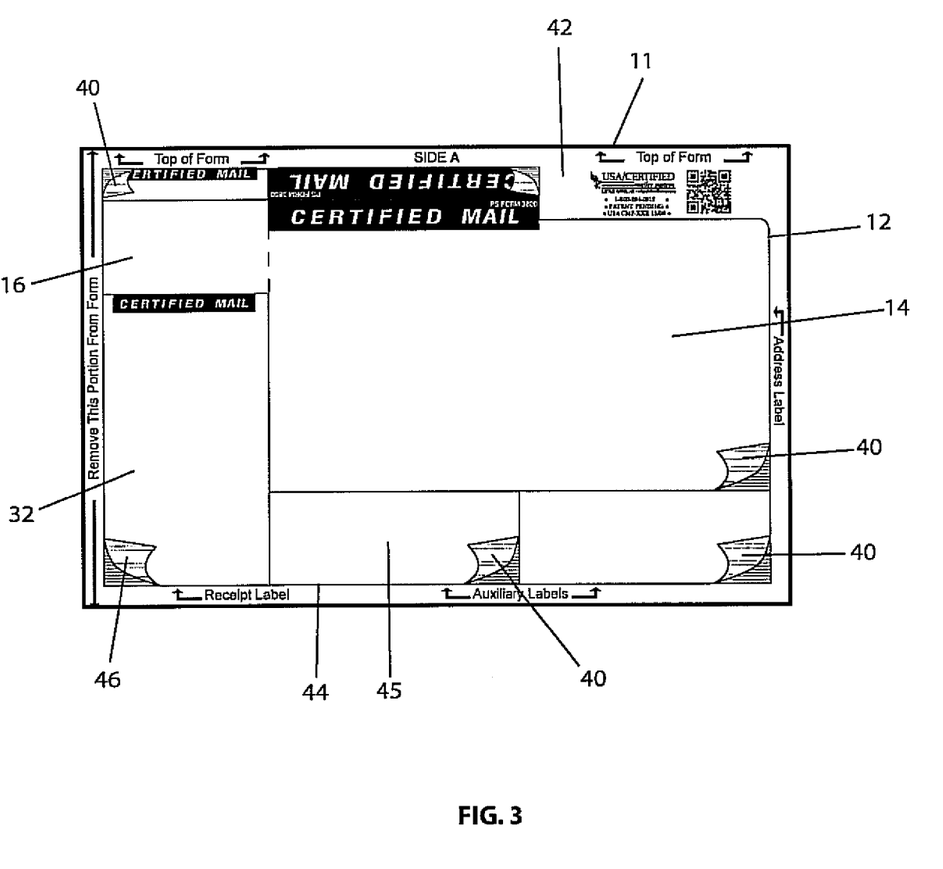
FIG. 3 illustrates a plan view of a front side of an embodiment of the present invention.

As shown in FIG. 3, the label 12, the address label 14, the return address label 16, the auxiliary labels 28, the receipt label 32 and the additional tracking label 36 may collectively form a label layer 44 removably attached to the sheet 11 of the form 10. The label layer 44 may have a front side 45 which may be printed and a back side 46 which may have an adhesive 40. The adhesive 40 may be a peel and stick type adhesive and may be provided to seal the label 12 to the mailpiece requiring special service mailing as shown in FIGS. 5 and 6. In addition to the label 12, one or more of the address label 14, the return address label 16, the auxiliary labels 28, the receipt label 32 and the additional tracking label 36 may be removable adhesive labels with the adhesive 40 on the back side 46 of each respective label.

For example, the additional tracking label 36 may be adhesively backed for subsequent attachment to the receipt 32 or other item requiring designation of the article number for related purposes. For example, the additional tracking label 36 may be used by a postal delivery employee on a USPS form PS 3849, a delivery notice, (not shown). Alternatively, the additional tracking label 36 may be used for the receiver's record use.

Certain sections of the label layer 44 and/or the form 10 discussed above may be pre-printed. Such sections of the label layer 44 may be printed on the front side 45 with corresponding relevant information, for example, the sender address 33, the recipient address 34, the special service indicator 19, the article ID number 22, the barcode 23, information on the receipt 32, a tracking number, postage, other address information and/or the like. Printing may be done using any one or more of various printing methods, such as, for example, duplex printing and/or simplex printing using a printer.

In an embodiment, the user of the form 10 may remove the desired labels having, for example, the sender address 33, the recipient address 34, the special service indicator 19, the article ID number 22, the barcode 23, information on the receipt 32, a tracking number, postage, other address information and/or the like and/or may affix certain desired labels to a shipping log, a tracking log, a receipt book and/or any other record-keeping book and/or device and/or the like. As shown in FIGS. 5 and 6, some of the labels may also be affixed to the mailpiece, as desired. However, it should be understood that the form 10 may be printed with any information that the user may require and/or may be affixed to any portion of the mailpiece, as desired. As shown in FIGS. 3, 5 and 6, the desired labels may be removed from the sheet 11 and may be affixed, for example, at locations on the envelope 20 shown in FIG. 5 or the package 30 shown in FIG. 6.

Figure 4:
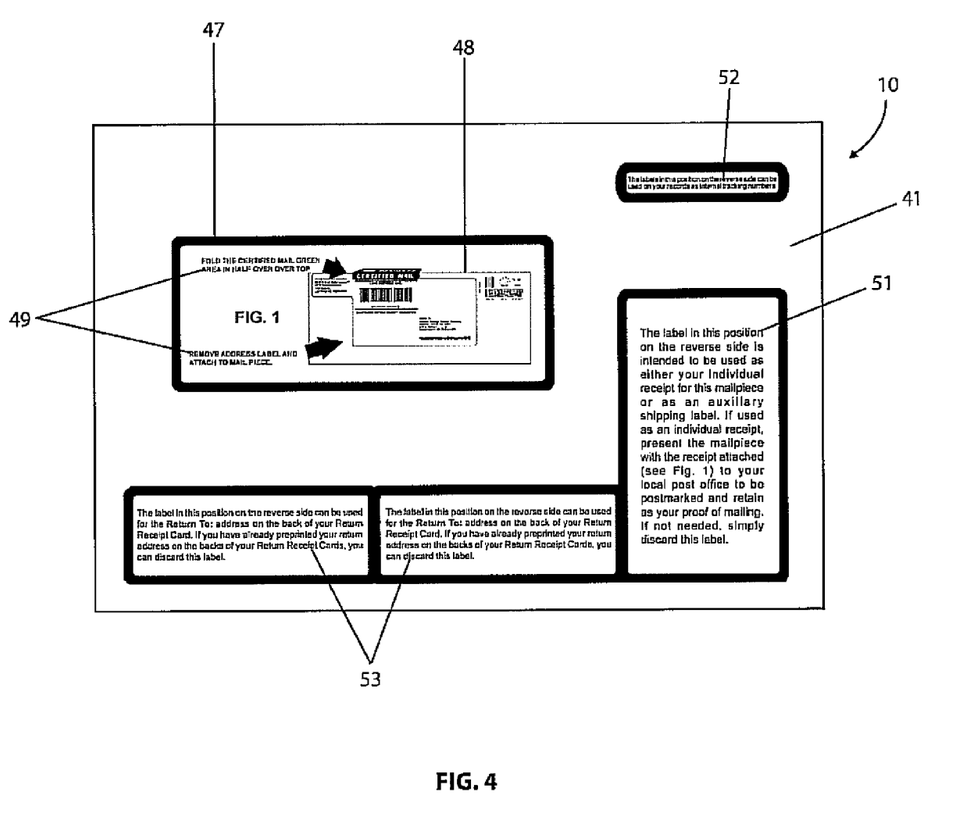
FIG. 4 illustrates a plan view of a back side of an embodiment of the present invention.

Referring now to FIG. 4, a back plan view of an embodiment of the form 10 is illustrated. The form 10 has a back side 41. The back side 41 of the form 10 may have information and/or instructions related to the items on a front side 42 of the form 10. For example, a label information section 47 may provide information and/or instructions on how to use and/or apply the label 12 on the front side 42 of the form 10. The label information section 47 may have an illustration 48 of the label 12 on the envelope 20 as shown in FIG. 5. The label information section 47 may also have accompanying text 49 describing how to use the label 12.

Similarly, a receipt label information section 51 may be located on the back side 41 of the form 10 in a position corresponding to the location of the receipt label 32 on the front side 42 of the form 10. The receipt label information section 51 may provide information related to the receipt label 32 and/or its uses.

Further, a tracking label information section 52 may be located on the back side 41 of the form 10 in a position corresponding to the location of the additional tracking label 36 on the front side 42 of the form 10. The tracking label information section 52 may provide information related to the additional tracking label 36 and/or its uses. For example, the additional tracking label 36 may be used as internal tracking numbers by the user in a shipping log, a tracking log, a receipt book and/or any other record-keeping book and/or device and/or the like.

Also, an auxiliary label information section 53 may be located on the back side 41 of the form 10 in a position corresponding to the location of the auxiliary label 28 on the front side 42 of the form 10. The auxiliary label information section 53 may provide information related to the auxiliary label 28 and/or its uses. For example, the auxiliary label 28 may be used as an extra address label or in any other manner desired by the user.

Referring now to FIG. 5, the envelope 20 requiring delivery by a special service is illustrated. The envelope 20 has a front side 55 and a back side 56 located opposite to the front side 55. The envelope 20 may also have a top edge 57. Sections of the label layer 44 of the form 10 may be attached to the envelope 20 as appropriate and/or as desired by the user. For example, the label 12 of the label layer 44 of the form 10 may be removed from the sheet 11 and may be affixed to the envelope 20.

As shown, the label 12, the address label section 14, the return address label section 16 and the special services designation section 18 and the special service indicator 19 may be affixed to the envelope 20 at or near the middle of the envelope 20 that may be near the top edge 57. These components of the label layer 44 of the form 10 may be adhered to the front side 55 of the envelope 20 by the adhesive 40 located on the back side 46 of label layer 44.

As also illustrated, the special services designation section 18 may have a tab 58 having an additional special service indicator 59 printed thereon. In an embodiment, the additional special service indicator 59 and the special service indicator 19 may be printed in such a way that they are inverted versions of each other. Thus, the special service indicator 19 on the special services designation section 18 may be affixed to the front side 55 of the envelope 20. The tab 58 having the additional special service indicator 59 may then be folded over the top edge 57 of the envelope 20 and onto the back side 56 of the envelope 20. In this manner, the special services desired may be visible from the front side 55 of the envelope 20 and/or from the back side 56 of the envelope 20. Postage 60 may also be applied to the front side 55 of the envelope 20. The postage 60 may be an ink stamp, an automated printed image indicative of the correct postage and/or a postage stamp.

As illustrated in FIG. 6, the package 30 may have a front side 61 and a top side 62 with a top edge 63 located at the intersection of the front side 61 and the top side 62. Sections of the label layer 44 of the form 10 may be attached to the package 30 as appropriate and/or as desired by the user. For example, the label 12 of the label layer 44 of the form 10 may be removed from the sheet 11 and/or may be affixed to the package 30.

As shown, the label 12, the address label section 14, the return address label section 16 and/or the special services designation section 18 and the special service indicator 19 may be affixed to the package 30 at or near the middle of the package 30 that may be near the top edge 63. These components of the label layer 44 of the form 10 may be adhered to the front side 61 of the package 30 by the adhesive 40 located on the back side 46 of the label layer 44.

As illustrated, the special services designation section 18 may have the tab 58 having the additional special service indicator 59. In an embodiment, the additional special service indicator 59 and/or the special service indicator 19 may be printed as inverted versions of each other. Thus, the special service indicator 19 on the special services designation section 18 may be affixed to the front side 61 of the package 30. The tab 58 having the additional special service indicator 59 may then be folded over the top edge 63 of the package 30 and onto the top side 62 of the package 30. In this manner, the special services desired may be visible from the front side 61 of the package 30 and/or from the top side 62 of the package 30. The postage 60 may also be applied to the front side 61 of the package 30. The postage 60 may be an ink stamp, an automated printed image indicative of the correct postage and/or a postage stamp.

Figure 7:
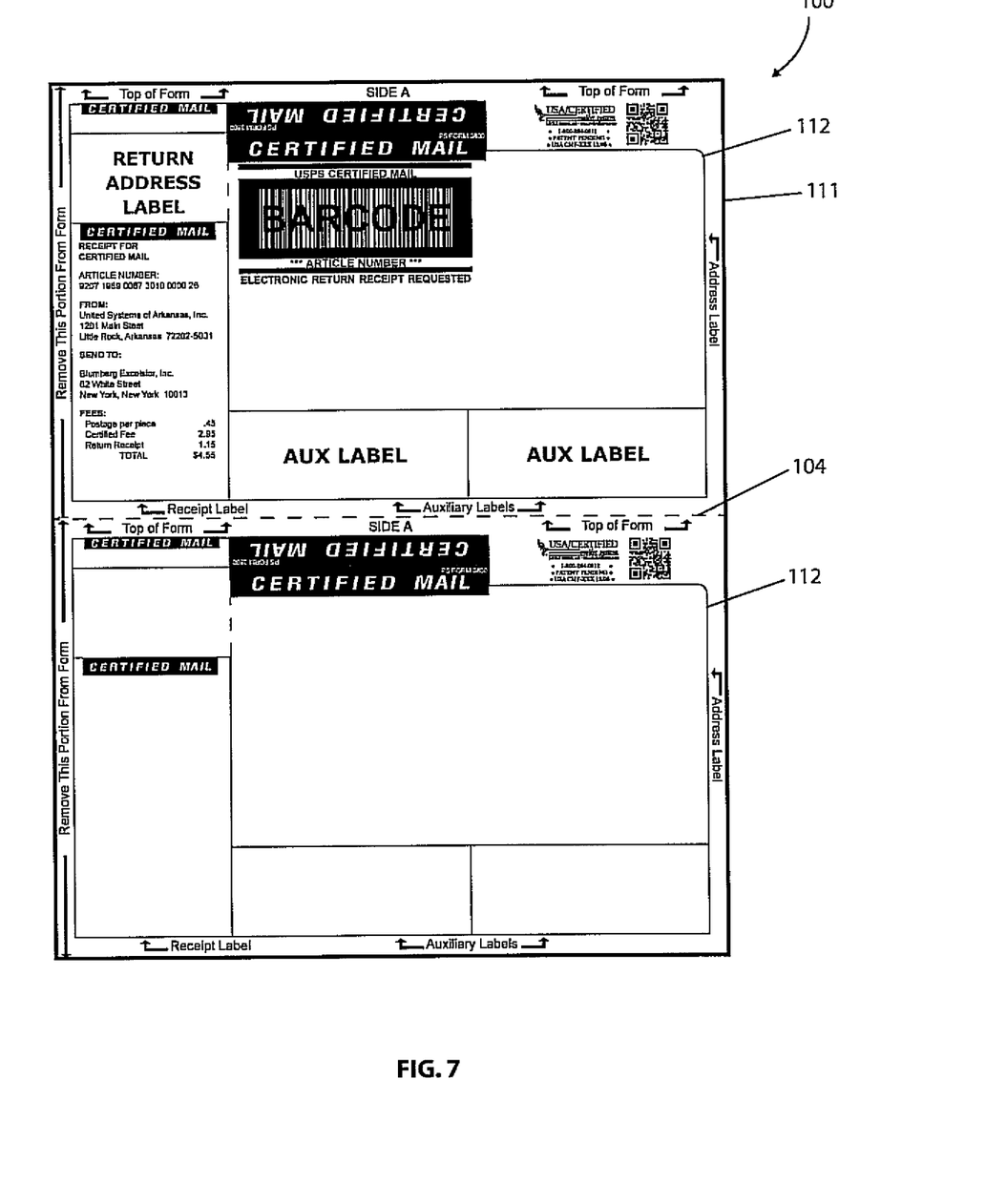
FIG. 7 illustrates a plan view of a front side of another embodiment of the present invention.
Figure 8:
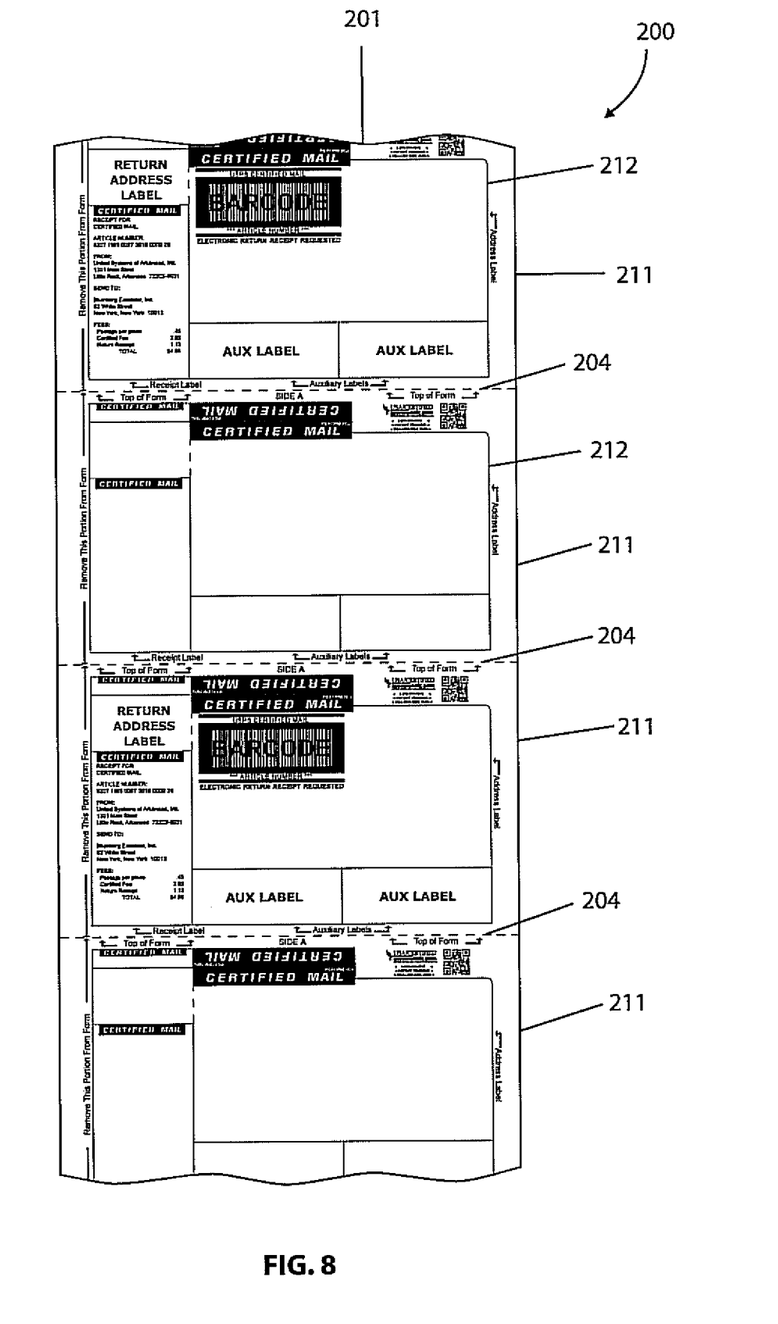
FIG. 8 illustrates a partial plan view of a front side of a further embodiment of the present invention.

As illustrated in FIGS. 7 and 8, more than one form 10 may be provided on a single sheet 11. For example, in an embodiment of the form shown in FIG. 7, two forms 10 are shown on one sheet 11.

Referring now to FIG. 7, an embodiment of an assembly 100 for special services delivery is illustrated. The assembly 100 may have a backing sheet 111 and a label layer 112 removably attached to the backing sheet 111 via an adhesive 113. Further, each of the label layers 112 of the forms 10 may be separable from each adjacent form 10 by a tear line 104. The assembly 100 may be similar to the single form 10 shown in FIGS. 1-6. However, the assembly 100 may have two label layers 112 on the backing sheet 111. The backing sheet 111 may be sized to accommodate two label layers 112 of the form 10. The assembly 100

The assembly 100 may be provided as a "blank" whereupon variable information may be printed. The variable information may include information relating to the special service and/or any other information required and/or desired to effect the delivery of the mailpiece requiring delivery by the special services. Each of the label layers 112 of the assembly 100 may be printed with the same information, for example, for sending multiple mailpieces to the same address. Also, each label layer 112 may be individually printed with unique information for separate mailings to different addressees and/or for sending the same mailpiece to different addressees.

Referring now to FIG. 8, another embodiment of an assembly 200 for special services delivery is illustrated. The assembly 200 may have a continuous roll 201 of backing sheets 211. The assembly 200 may have a plurality of the forms 10 illustrated in FIG. 1. However, the plurality of forms 10 may be provided on the continuous roll 201 of the backing sheets 211. The assembly 200 may have a label layer 212 removably attached to each of the backing sheets 211 via an adhesive 213. Further, each of the label layers 212 of the forms 10 may be separable from each adjacent form 10 by a tear line 204. In such a case, preferably, each of the label layers 212 of the form 10 may be a peel-and-stick label that may be removably attached to the sheet 211.

The assembly 200 may be provided as a "blank" whereupon variable information may be printed including information relating to the special service and/or any other information required and/or desired to effect the delivery of the mailpiece requiring the special services. Each of the label layers 212 of the assembly 200 may be printed with the same information, for example, for a bulk mailing of the same mailpiece. Also, each of the label layers 212 may be individually printed with unique information for separate mailings to different addressees.

The entire mailing assembly 100 and/or 200 may be provided without the necessary information required for delivery of the mailpiece by a special service, that is, in effect, provided as a "blank" mailing assembly. The mailing assembly 100 and/or 200 may then be fed into a printing device whereupon the necessary information for delivery by the special service may be printed on one or more of the forms 10 of the entire mailing assembly 100 and/or 200. Thus, each of the individual forms 10 may be detached as needed from the backing sheet 111 and/or 211, respectively.

In an embodiment, the tear line 104 of the assembly 100 and/or the tear line 204 of the assembly 200 may extend through the respective backing sheet 111 and/or 211 that may subdivide the backing sheet 111 and/or 211 into a plurality of individual backing sheets. Each of the forms 10 and the backing sheet 111 and/or 211 may be separated from each other.

Also, each assembly 100 and/or 200 may be removable from an adjacent mailing assembly via the tear line 104 and/or 204, respectively.

Thus, a plurality of the forms 10 may be connected in an end-to-end fashion on the continuous roll 201. The forms 10 may be incorporated in a series of the forms 10 that may be continuously repeated and/or may be linked together such that the forms 10 are incorporated as a continuous series of the forms 10 or, alternatively, a roll of the forms 10, or the like.

In this embodiment, each of the sheets 211 of each of the forms 10 may be removably connected to each other via the tear lines 204. Also, each of the forms 10 may be removably attached to each of the sheets 211 on the continuous roll 201. Thus, each of the forms 10 may be separable from an adjacent form. In this embodiment, the form 10 may be a peel and stick type form that may be removably attached to the sheet 211. Thus, each of the forms 10 may be detached from each of the sheets 211 as needed. Also, the continuous roll 201 of the sheets 211 may be printed at one time for subsequent separation and/or application to separate mailpieces. In use, the forms 10 may be removed from the continuous roll 201 and/or subsequently attached to the mailpiece for delivery by the special service.

Moreover, the form 10, either individually, or in the assembly 100 and/or the assembly 200, may be printed using any known method of printing and is not limited to any single type. Such printing methods may include, but are not limited to, laser printing, thermal printing, dot matrix printing and the like. Printing may be performed on continuously fed forms and/or on individually fed forms.

The form 10 may be prepared and/or processed in an automated manner using the computer system 300 having a mailing/tracking software application. An embodiment of the computer system 300 is illustrated in FIG. 9. The computer system 300 may have a computer 305 connected in a network 310. The network 310 may be any of a general local area network ("LAN"), a wireless local area network ("WLAN"), a wireless personal area network ("WPAN") and the like. The network 310 may operate on a common wired Ethernet network or a Wi-Fi network (the brand name for products using IEEE 802.11 standards). The network 310 may be used for printing, transferring files and the like. Various components in the network 310 may be connected to operate as desired. The network 310 may be capable of accessing the Internet 330.

For example, the computer system 300 may have a user interface 315 for inputting and/or viewing data related to the printing, preparation and/or delivery status of the form 10. The user interface 315 may be a terminal, a keyboard, a handheld device and the like. Any known user interface may be used and is considered to be within the scope of the invention. A printer 320 may also be connected and/or networked to the computer system 300 in the network 310. The connection of the printer 320 to the computer system 300 in the network 310 may use wires, cables, fiber optics and the like. Alternatively, wireless, Bluetooth and/or Wi-Fi interfaces may be used as a replacement for cabling. In particular, Bluetooth may be used for portable equipment and its applications. Also, Bluetooth may be a replacement for cabling in a variety of personally carried applications in any setting and also may work for fixed location applications.

Figure 10:
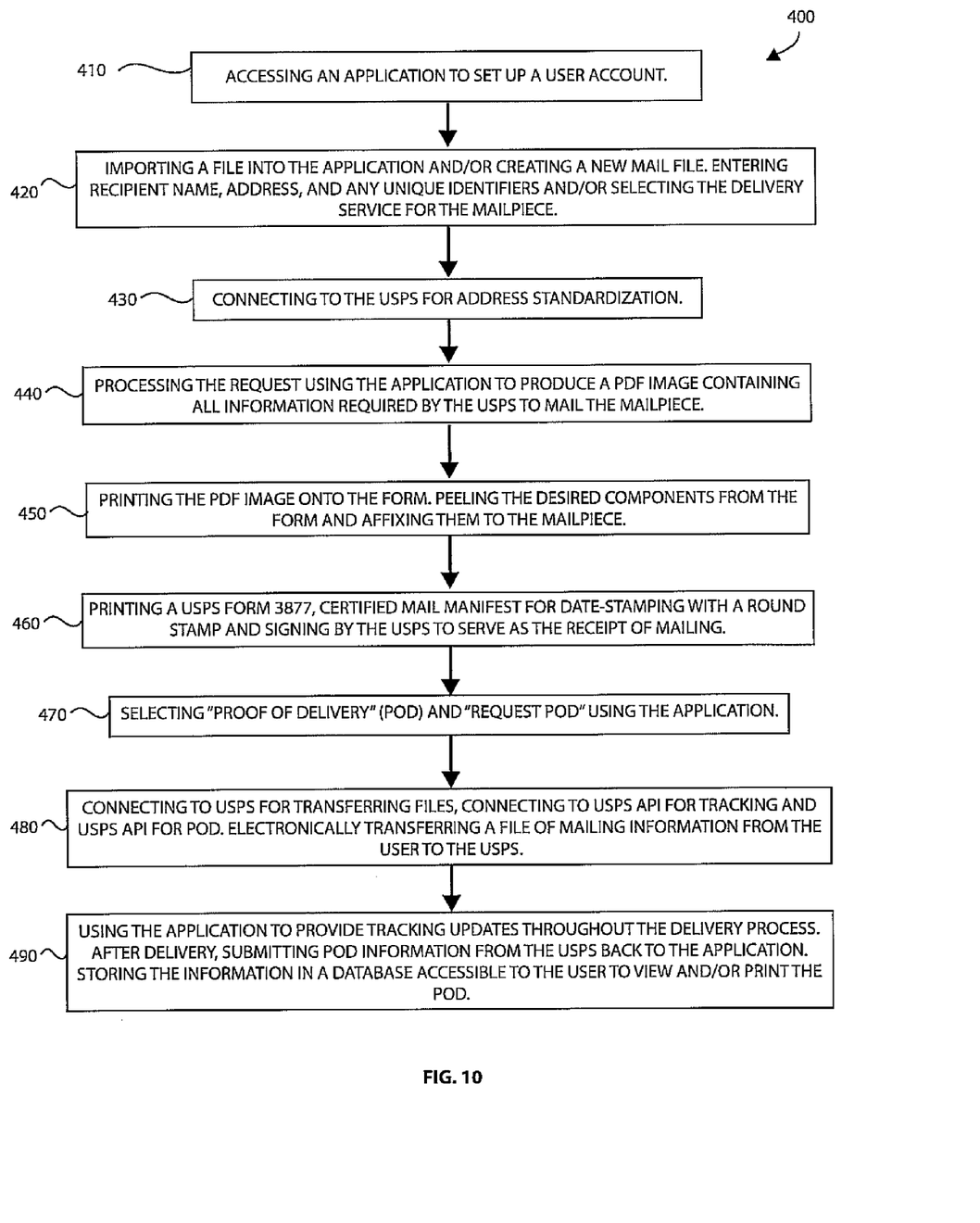
FIG. 10 illustrates a flowchart of an embodiment of a method of the present invention.

In an embodiment shown in FIG. 10, a method 400 for using a special service mailing label and/or form for mailing an article requiring delivery by a special service having an electronic return receipt with a label indicative of the special service is provided. The user may utilize the computer system 300 shown in FIG. 9 for performing the method 400 shown in FIG. 10. The method 400 may allow the user to input and/or view data related to printing, preparation and/or delivery status of the form 10. The user may obtain a supply of the forms 10. Also, the user may obtain initial logon information for using a software application.

In step 410, the user may log on to a website, for example, USAMailer.com operated by the assignee of the present application, to access the application. The user may log on using the user interface 315 of the computer system 300. The user may have the option within the application to set up multiple accounts and/or mailings for different users.

In step 420 of the method 400, the user may either import a file into the application and/or may create a new mail file. In step 420, the user may enter recipient name, address, and any unique identifiers. In step 420, the user may also select the manner for delivery of the mailpiece by the USPS. In the illustrated embodiment of the form 10, the user may select First Class, Certified, and Electronic Return Receipt (ERR).

The method 400 may also have a step 430 in which the application may utilize an Application Programming Interface (API) to connect to the USPS for address standardization. In step 440 of the method 400, the user may process the request using the application. The application may produce a pdf image. The pdf image may contain all information required by the USPS to mail the mailpiece desired.

In step 450, the user may print the pdf image using the printer 320 of the computer system 300 onto the form 10. The user may remove the desired components of the form 10 and/or may affix the components to the mailpiece as required. Referring again to FIGS. 1 and 2, the user may remove the label 12 and/or the address label section 14. The address label section 14 may be pre-printed with the address of the intended recipient of the envelope 20 shown in FIG. 5 or the package 30 shown in FIG. 6. The form 10 may also have a return address label 16. The return address label 16 may be pre-printed with the address of the sender of the mailpiece. Further, the label 12 may have the special services designation section 18 that may have information indicative of the special service on the label 12. The desired components of the form 10 may be affixed to the mailpiece.

In step 460, the user may use the application to print a USPS Form 3877, which is a Certified Mail Manifest. The Form PS-3877 may be presented if three or more Certified Mail letters are mailed at a USPS Post Office. The computer-generated manifest may contain postal information, rates, fees and article numbers approved by the postmaster. The user may present three or more letters and have the manifest date-stamped with a round stamp and signed by the USPS acceptance person. The stamped Form PS-3877 may serve as a receipt or proof that the letter was accepted into the USPS mail stream. The Form PS-3877 may thus provide the receipt of mailing.

In step 470, the user may also select "Proof of Delivery" (POD) using the application and then "Request POD." In step 480 of the method 400, the application may connect to USPS for transferring files, connecting to USPS API for Tracking and USPS API for POD. A file of mailing information and the information submitted by the user may be electronically transferred to the USPS utilizing the application.

In step 490 of the method, the application may provide tracking updates throughout the delivery process. After delivery, the USPS may submit POD information back to the application. The application may store the information in a database that may be accessible to the user. The user may log on to the application on the website USAMailer.com to view and/or print the POD.

Other variations and/or configurations which are known to one having ordinary skill in the art are possible and are deemed to be within the scope of this disclosure. The materials used for the components of the form 10 may be selected from any suitable material to perform the desired function for operation of the form 10. The materials must also be capable of withstanding environmental conditions that may be encountered. Considerations of performance and/or reliability are also important in the selection of the material. Other materials which are known to one having ordinary skill in the art may be selected and are deemed to be within the scope of this disclosure.

As disclosed above, the form 10 may also be manufactured in numerous embodiments. The various embodiments of the form 10 may have additional components which may provide enhanced functionality of the form 10.

Moreover, the present invention is not limited to the specific arrangement of the components illustrated in the figures. It should be understood that various changes and modifications to the presently preferred embodiments described herein will be apparent to those having ordinary skill in the art. Such changes and modifications may be made without departing from the spirit and scope of the present invention and without diminishing its attendant advantages. It is, therefore, intended that such changes and modifications be covered by the appended claims.

We claim:

1. A form for special service delivery of a mailpiece having a front side and a back side wherein the back side is located opposite to the front side, the form comprising:

a sheet;

a label attached to the sheet wherein the label has a top end, a front side and a back side wherein the back side is located opposite to the front side and further wherein the label has information related to the delivery of the mailpiece by the special service on the front side and wherein the label is removed from the sheet and the back side of the label attaches to the mailpiece;

a tab on the label wherein the tab is integral with and extends from the top end of the label and has a first special service indicator in an upright orientation relative to the information related to the delivery of the mailpiece by the special service on the front side of the label and a second special service indicator in an inverted orientation relative to the upright orientation of the first special service indicator wherein a fold line is located between the first special service indicator and the second special service indicator and further wherein the tab is removed with the label from the sheet and attaches to the mailpiece wherein the first special service indicator attaches to the front side of the mailpiece with the fold line aligned to an edge of the mailpiece and the second special service indicator on the tab is configured to fold over the edge of the mailpiece and attaches onto the back side of the mailpiece wherein the first special service indicator is visible in the upright orientation from the front side of the mailpiece and the second special service indicator is visible in the upright orientation from the back side of the mailpiece;

a first section on the front side of the label wherein the first section has information related to an electronic return receipt service associated with the mailpiece wherein the first section has a machine-readable code section having machine-readable information associated with the mailpiece; and a second section on the front side of the label wherein the second section has information indicative of the special service for delivery of the mailpiece.

2. The form of claim 1 further comprising:
an adhesive on the back side of the label.

3. The form of claim 1 further comprising:
an auxiliary label on the form.

4. The form of claim 1 wherein the sheet is a silicone sheet.

5. The form of claim 1 further comprising:
an auxiliary special service designator section removably attached to the sheet wherein the auxiliary special service designator section has information indicative of the special service.

6. The form of claim 1 further comprising:
a receipt removably attached to the sheet wherein the receipt has information associated with the delivery of the mailpiece by the special service.

7. The form of claim 1 further comprising:
an address label removably attached to the sheet wherein the address label has information associated with a delivery address of the mailpiece.

8. The form of claim 1 further comprising:
an auxiliary information section printed on the sheet wherein the auxiliary information section has information unrelated to the mailpiece.

9. The form of claim 1 further comprising:
a Quick Response (QR) code printed on the sheet wherein the QR code has machine-readable information.

10. The form of claim 1 further comprising:
instructions for use of the form printed on the sheet.

11. The form of claim 1 wherein the label has information that equates to U.S. Postal Service Form 3800 to permit mailing the mailpiece without attaching U.S. Postal Form 3800.

* * * * *